United States Patent [19]

Jones

[11] Patent Number: 5,034,761
[45] Date of Patent: Jul. 23, 1991

[54] PHOTOGRAPHIC EXPOSURE CONTROL APPARATUS HAVING REMOTE FILTER HOLDER MECHANISM

[76] Inventor: Aaron Jones, 3 Vaquero Rd., Santa Fe, N. Mex. 87502

[21] Appl. No.: 600,520

[22] Filed: Oct. 19, 1990

Related U.S. Application Data

[63] Continuation-in-part of Ser. No. 508,057, Apr. 11, 1990.

[51] Int. Cl.⁵ .............................................. G03B 15/02
[52] U.S. Cl. .................................... 354/129; 354/133; 354/149.1; 354/288; 354/267.1; 354/290; 354/295; 362/17
[58] Field of Search ............ 354/129, 133, 146, 149.1, 354/266, 267.1, 288, 413, 414, 456, 410, 412, 290, 295; 362/17, 32

[56] References Cited

U.S. PATENT DOCUMENTS

| | | | |
|---|---|---|---|
| 4,063,263 | 12/1977 | Krenwalk, Sr. ...................... | 354/295 |
| 4,310,228 | 1/1982 | Terada ................................ | 354/413 |
| 4,385,344 | 5/1983 | Gonser ................................. | 362/32 |
| 4,530,036 | 7/1985 | Conti .................................... | 362/32 |
| 4,553,193 | 11/1985 | Evans .................................... | 362/3 |
| 4,557,574 | 12/1985 | Kohno et al. ....................... | 354/288 |
| 4,755,912 | 7/1988 | Evans .................................... | 362/8 |
| 4,876,563 | 10/1989 | Ishida et al. ........................ | 354/288 |

*Primary Examiner*—W. B. Perkey
*Assistant Examiner*—Cassandra C. Spyrou
*Attorney, Agent, or Firm*—Kolisch, Hartwell, Dickinson, McCormack & Heuser

[57] ABSTRACT

A photographic exposure control apparatus includes a directable light source, and an auxiliary shutter which is located between a camera lens and a subject. The auxiliary shutter includes a housing structure which has a window therein. The window is selectively opened and closed by a blade which is movably mounted on the housing structure, which is motor driven, and which allows the housing structure to block entry of light into a camera lens when the window is closed, and to allow light into the lens when the window is open. A filter holder is mounted on the housing and is selectively remotely insertable between the lens and a subject.

7 Claims, 3 Drawing Sheets

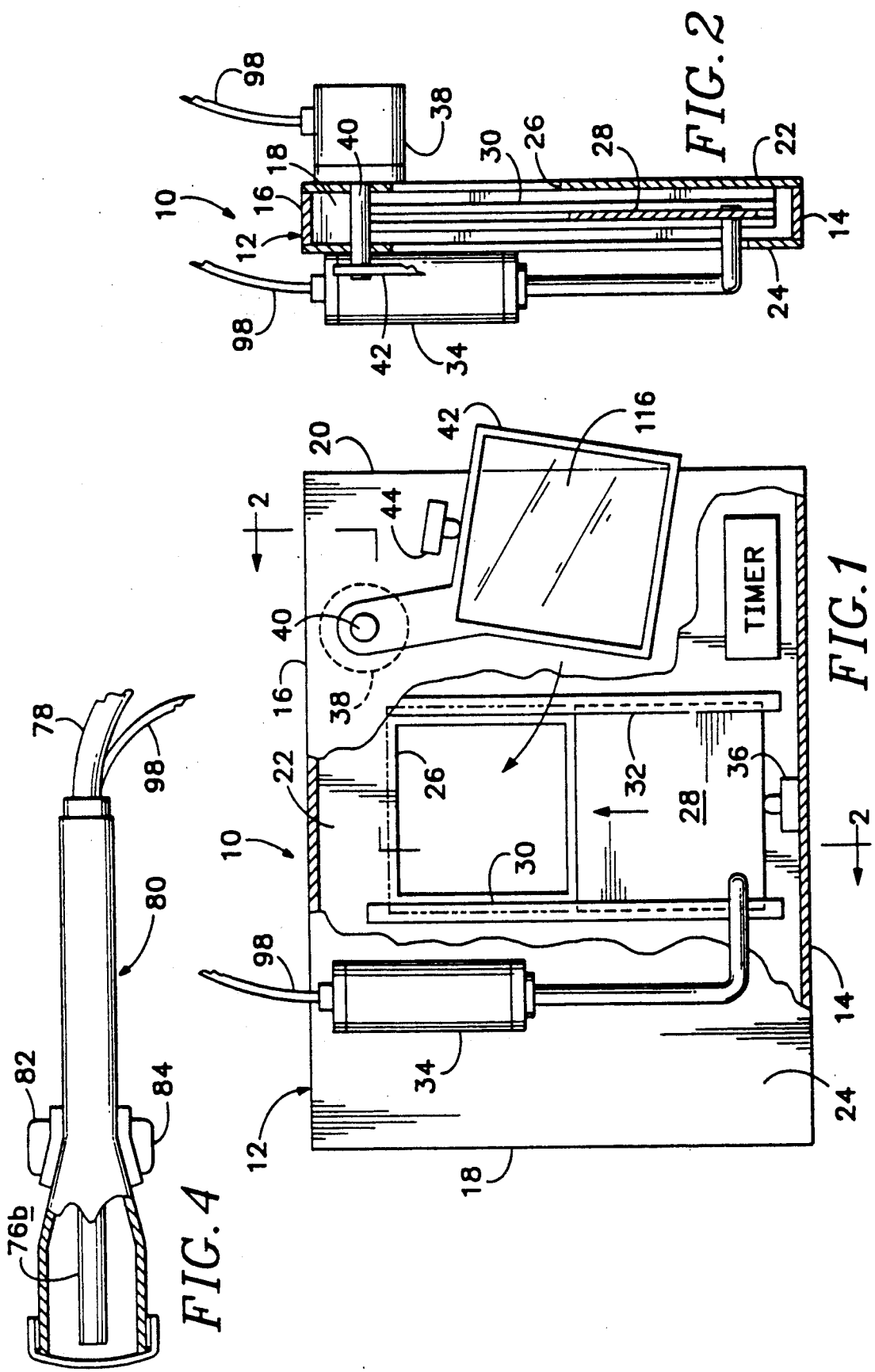

PHOTOGRAPHIC EXPOSURE CONTROL APPARATUS HAVING REMOTE FILTER HOLDER MECHANISM

RELATED APPLICATION

This application is a continuation-in-part of Ser. No. 07/508,057, filed Apr. 11, 1990 for PHOTOGRAPHIC EXPOSURE CONTROL APPARATUS AND METHOD.

BACKGROUND AND SUMMARY OF THE INVENTION

The invention relates to photographic equipment, and specifically to an exposure control apparatus which facilitates selective exposure of a portion of photographic film from a highlighted portion of a subject being photographed, and which includes a remotely-controlled filter holder for selectively inserting a filter between a camera lens and subject.

A photographic image may be enhanced with the application of carefully controlled light to specific portions or parts of the subject being photographed. Known techniques for accomplishing such selective lighting includes multiple flash exposures directed at a specific part of the subject while the camera shutter remains open, using a flashlight type device light over specific parts of the subject with the camera lens open, or using a fiber-optic cable to direct light to the subject, again, with the camera lens held open. In the preceding techniques, the light source is turned on and off as required to control light directed towards to subject.

Another technique is to open the camera shutter, block any light from entering the camera lens with a dark obstruction and periodically removing the obstruction while the light is moved over specific areas of the subject.

One skilled in the art can readily perceive that continuous switching on and off of a light source or blocking the camera lens with a hand-held opaque object requires a great deal of coordination and does not lend itself to readily repeatable results.

In some situations, it is desirable to provide a soft-focus filter between the camera lens and a subject. The easiest way to accomplish this is to place a filter on the threaded receiver of a camera lens. Such technique is disclosed in the parent case, identified above. Placing and removing a filter from an open camera lens may be done once or twice during a shoot, however, repeated contact with the camera lens is likely slightly to move the camera and ruin the photograph.

An object of the invention is to provide an apparatus for selectively exposing portions of a light-sensitive film with light reflected from a subject being photographed, and to be able to do so with predictable repeatability.

Another object of the invention is to provide an apparatus which will facilitate the aforementioned object, and which includes a mechanism for inserting and removing a filter between the camera lens and the subject.

A further object of the invention is to provide an apparatus which will not affect camera stability during extended, repeat exposures.

The photographic exposure control apparatus of the invention includes a directable light source, and an auxiliary shutter which is located between the camera lens and the subject. The auxiliary shutter includes a housing structure which has a window therein. The window is selectively opened and closed by a blade which is movably mounted on the housing structure, which is motor driven, and which allows the housing structure to block entry of light into a camera lens when the window is closed, and to allow light into the lens when the window is open. A filter holder is attached to the housing and allows selective, remote insertion and removal of a filter.

These and other objects and advantages of the invention will become more fully apparent as the description which follows is read in conjunction with the drawings.

BRIEF DESCRIPTION OF THE DRAWINGS

FIG. 1 is a front elevation of an auxiliary shutter constructed according to the invention, with portions broken away to show detail.

FIG. 2 is a side elevation of the auxiliary shutter of the invention, taken generally along the line 2—2 of FIG. 1.

FIG. 4 is a greatly enlarged side elevation of a fiber-optic directing wand of the invention.

DETAILED DESCRIPTION OF THE PREFERRED EMBODIMENTS

Figure 3:
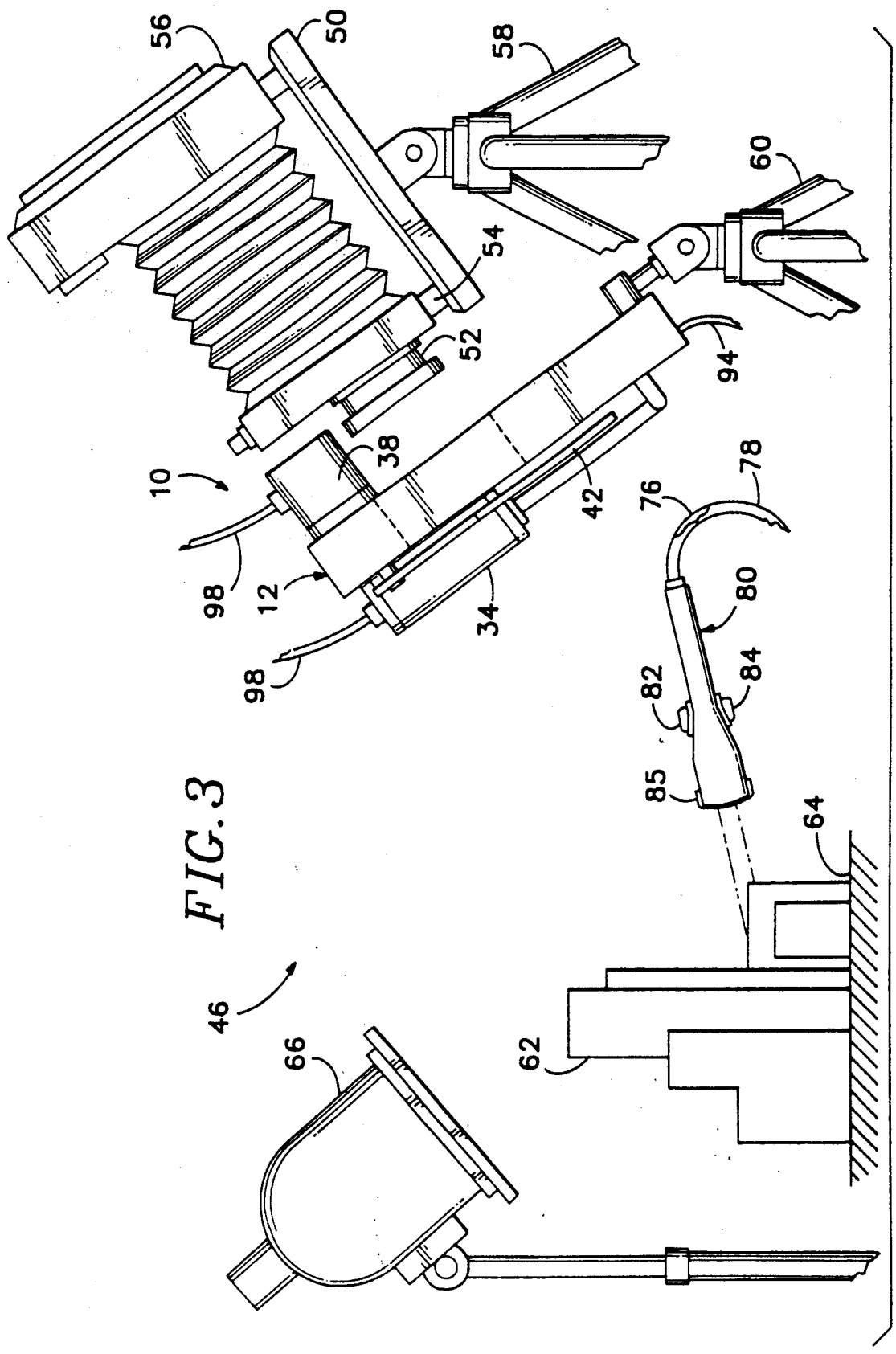
FIG. 3 is a side elevation of the auxiliary shutter of the invention arranged for a photographic session.

Referring now to the drawings, and initially to FIGS. 1 and 2, the auxiliary shutter exposure control apparatus of the invention is shown generally at 10.

Auxiliary shutter 10 includes a housing structure 12, which is generally rectangular in the preferred embodiment. Housing structure 12 includes a bottom side 14, a top side 16, and spaced part ends 18, 20. An upper surface 22 is spaced from a lower surface 24 by the width, or height of the sides of the housing structure.

A window 26 is formed between the upper and lower surfaces of housing structure 12, and in the preferred embodiment, is rectangular in shape, with each side thereof having a dimension of approximately 5 inches. Window 26 is opened and closed by the shifting of a blade, or blade means 28, which, in the preferred embodiment, is shiftably mounted within housing structure 16, within the confines of the sides and upper and lower surfaces and slides in rails 30, 32, which are secured to the inside of lower surface 24. In this embodiment of the apparatus, blade 28 takes the form of a single leaf, which has a rectangular configuration and which is moved by a linear solenoid, or motor, 34. Motor 34 is secured to housing structure 16 and is operable to shift blade 32 between a withdrawn condition, as depicted in solid lines in FIG. 1, and an extended position, as shown by the dashed lines in FIG. 1. A first switch 36 is provided in housing structure 16 and is closed when blade 32 reaches its fully withdrawn position. The operation of the mechanism activated by switch 36 will be described later herein. Alternately, a multiple blade shutter mechanism, such as depicted in parent application Ser. No. 07/508,057, filed Apr. 11, 1990 for PHOTOGRAPHIC EXPOSURE CONTROL APPARATUS AND METHOD, which is incorporated herein by reference, may be used in place of the single blade 28.

A rotary solenoid 38 is attached to upper surface 22 and has a shaft 40 extending therefrom through housing 12. A filter holder 42 is attached to the free end of shaft 40 and is shiftable between a withdrawn position, shown in FIG. 1, and an extended position wherein the filter holder shifts to surround window 26.

Figure 5:
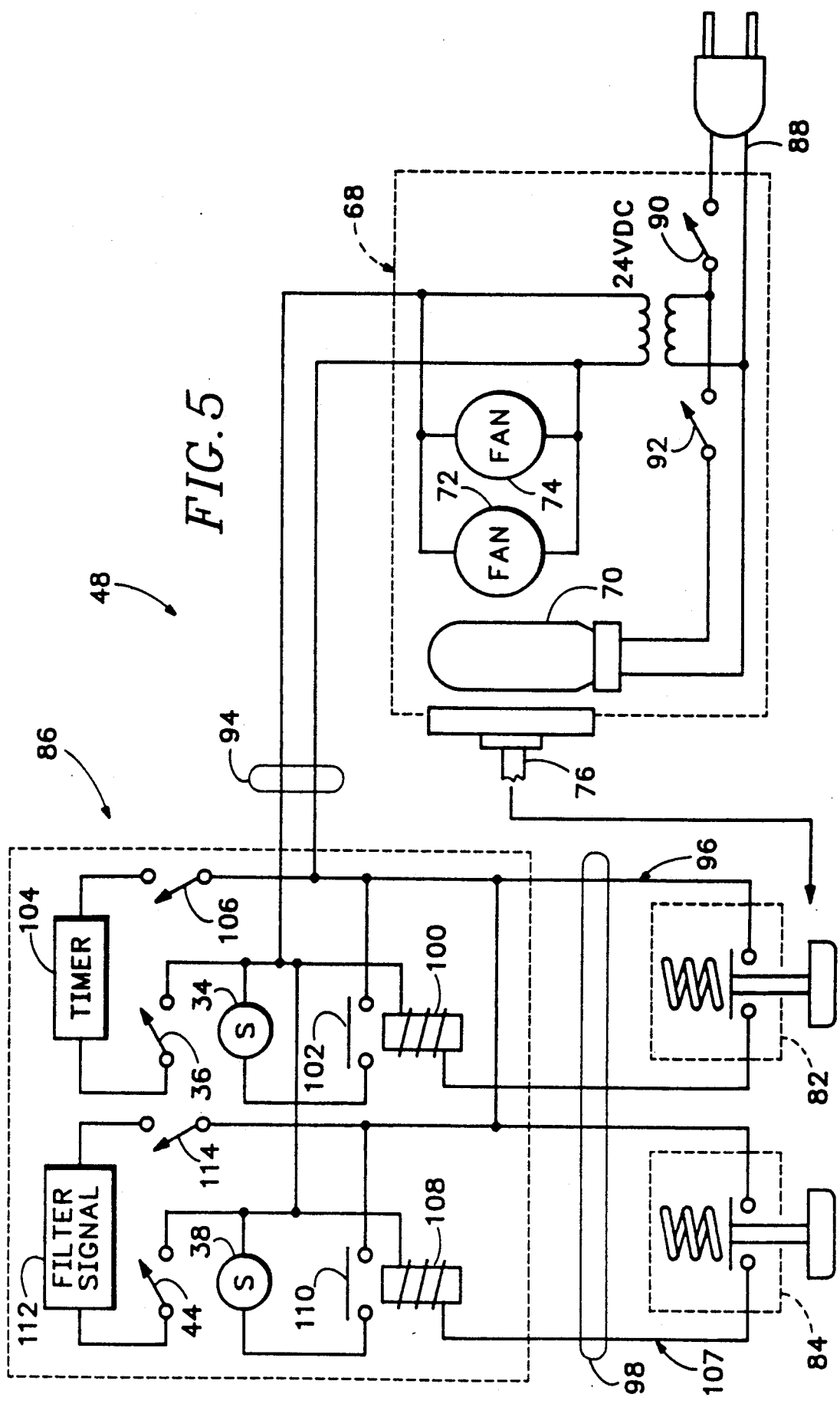
FIG. 5 is a schematic diagram of the electrical circuit of the invention.

Referring now to FIGS. 3, 4 and 5, a complete photographic exposure control apparatus is shown generally at 46. Apparatus 46 includes auxiliary shutter 10, and a directable light source, or directable light source means, shown generally at 48 (FIG. 5). Apparatus 46 is generally intended for use in a photo studio where lighting conditions may be closely controlled.

As depicted in FIG. 3, axillary shutter 10 is used in conjunction with a camera 50, having a lens 52, a shutter release 54 and a film holder 56, containing light-sensitive photographic film therein. Camera 50 is mounted on a camera stand 58 to hold the camera in a fixed position during the shoot.

Auxiliary shutter 10 is carried on a separate stand 60 with window 26 aligned, and close to lens 52, to enable the image of a subject 62 to pass through window 26 in an unobstructed manner. Subject 62 is placed on a stand 64 and may be illuminated by one or more flood or strobe lights, such as light 66, to provide proper subject-/camera alignment, focussing and perspective. Only one such light is depicted in FIG. 3 to simplify the drawing.

Referring now to FIG. 5, a directable light source includes a light-tight enclosure, schematically represented by box 68, contains a light source 70. In the preferred embodiment, light source 70 is a projection bulb of a tungsten or daylight color balance depending on the type of film used or effect desired. Other types of light sources may be provided to achieve different effects. As may be expected, light source 70 generates heat as well as light, and for this reason, fans 72, 74 are provided in enclosure 68 to provide cooling air over light source 70. Enclosure 68 is provided with suitable baffles to allow the intake and exhaust of air from the interior thereof without allowing any light to be emitted from the enclosure. Enclosure 68 is mounted on casters or rollers to provide free rolling movement of the enclosure about the studio. Details of enclosure 68 and directable light source 48 are provided in the above-identified parent patent application.

An elongate, fiber-optic cable 76 is connected to enclosure 68, with one end 76a thereof being located proximal to light source 70, thereby picking up light from light source 70 and conducting it along the length of the cable to the other end 76b thereof, in directable light source 48, where the light is emitted. Cable 76 is wrapped with an opaque shield 78 to prevent light from escaping through the sides of the cable, and to protect the outer surface of the cable during use. Cable 76 may be used to pull enclosure 68 about the studio.

Turning momentarily to FIG. 4 a cable-directing wand 80 is depicted having cable 76 extending therethrough. Wand 80 provides a grip at the other end of cable 76 and provides a fixation device for other components of the apparatus. A blade activation switch 82 and a filter activation switch 84 are carried on wand 80, as is what is referred to herein as attachment means 86, which may be used to affix special effects, filters, marks, etc to wand 80.

Turning now to FIG. 5, an electrical control circuit of the apparatus is depicted generally at 86. Circuit 86 includes a conventional power supply cord and plug 88 which is connected to light-tight enclosure 68. As previously noted, light-tight enclosure 68 includes a light source 70 and fans 72, 74. A fan switch 90 is operable to turn fans 72, 74 on and a light switch 92 is operable to turn light source 70 on. The circuit is arranged such that light source 70 cannot be turned on unless fans 72, 74 are running. This allows light source 70 to be turned off while fans 72, 74 remain running at the end of a session to cool enclosure 68. Alternately, a heat sensor switch may be used to control fans 72, 74. A cable 94 extends from light-tight enclosure 68 to auxiliary shutter 10. Alternately, of course, auxiliary shutter 10 may have a separate power cord and plug and be completely independent of light-tight enclosure 68.

Auxiliary shutter 10, as previously noted, contains linear solenoid 34, which is attached to blade 28 and which is connected to cable 94. A connection circuit 96 is located between blade activation switch 82 and solenoid 34 and includes a cable 98 which extends between auxiliary shutter 10, along fiber-optic cable 76, secured to the outside of sheath 78, and which terminates at blade activation switch 82. In the preferred embodiment, a relay 100 is located in auxiliary shutter 10 and closes a relay switch 102, which activates linear solenoid 34.

Blade activation switch 82 and relay 100 are constructed and arranged to alternately activate and deactivate solenoid 34 in a toggle-like manner, thereby alternately opening and closing window 26 with blade 28. This feature is accomplished by using a latching mechanism on blade activation switch 82 which, when the switch is initially pressed, forms a connection closing relay switch 102, which will remain closed until blade activation switch 82 is pressed again, thereby unlatching its mechanism and releasing relay 100 and relay switch 102. Blade activation switch 82, motor 34 and connection circuit 96, including relay 100 and relay switch 102, comprise what is referred to herein as blade activation means or activation mechanism. The components in the auxiliary shutter are, in preferred embodiment as well as fans 72, 74, operated with 24 V DC.

A timer, or timing means, 104 is provided, and includes a mechanism to provide an indication of elapsed exposure time when blade 28 is in its fully withdrawn position, which results in the closure of switch 36. Timer 104 is constructed, in the preferred embodiment, to provide a timing increment of one-second and includes a sound generator for emitting a audible sound, such as a beep, at the end of each one-second increment. Such combined timers/sound generators are believed to be well known to skilled in the art. For reason which become apparent later herein, it is important that the photographer know how long window 26 is open for any given exposure. A timer deactivation switch 106 is provided to deactivate timer 104.

Filter holder 42 is connected to circuit 86 and is activated by filter activation switch 84, which is connected through cable 98 to auxiliary shutter 10. A connection circuit 107 for filter holder 42 includes a relay 108, and relay switch 110. When switch 110 is closed, rotary solenoid 38 shifts filter holder 42 over window 46. Second switch 44 is of the normally open type, such that when filter holder 42 shifts to its extended position over window 26, second switch 44 closes, thereby activating a filter signal 112, which includes a steady or pulsed tone, which is different than that generated by timer 104. A filter signal deactivation switch 114 is provided to eliminate the tone when filter holder 42 is in its extended position. As previously noted, filter activation switch 84 is of the momentary contact type and must be held in its closed position in order to maintain filter 42 over window 26. Once filter activation switch 84 is released, filter holder 42 shifts to its withdrawn position, thereby opening second switch 44 and terminating the tone from filter signal 112.

Suitable connectors are provided between cable 98, enclosure 68 and auxiliary shutter 10 to allow wand 80 and cable 98 to be detached from shutter 10 and enclosure 68, and also to allow shutter 10 to be disconnected from enclosure 68 for easy transportation and storage. Details of such connectors are well known to those skilled in the art.

Circuit 86 may be modified by the removal of solenoid(s) 100 and/or 108, and their associated switches 102, 110, respectively, and the direct connection of the two activation switches to their respective solenoids, depending on the electrical capacity of the circuit and the length of cable 98.

Operation of apparatus 10, enables a photographer to direct emitted light from end 76b of fiber-optic cable 76 to a desired location on subject 62. With the apparatus and method of the invention, photographs may be created which have a strong resemblance to art work done by an artist using an airbrush in that particular surfaces, curves, angles, etc., may be accentuated or highlighted. This technique is similar to what is referred to as "dodging" during the darkroom processing of a print, in that light is directed to a specific area of what will be the final image to accentuate highlights which would not otherwise be emphasized. One way to describe the method of the invention is that it is painting with light, much as an artist paints with a brush.

As previously noted, the camera, subject and auxiliary shutter are arranged such that the camera has a clear view of the subject. Initially, an exposure of the film in holder 56 is made in a conventional manner by depressing shutter release 54, which activates the shutter in camera 50 and may also simultaneously trigger strobe lights, such as light 66. The initial exposure is calculated to greatly under-expose the film. Various photographic filters, such as a filter 116, carried in filter holder 42 may be placed between lens 52 and subject 62 during the initial exposure. The initial exposure may be conducted in ambient studio lighting or in complete darkness, depending on the effect which is to be achieved.

Once the initial exposure is made, and if the studio lights have already not been extinguished, the lights are turned out, leaving the studio is complete darkness. The window in the auxiliary shutter is closed, the appropriate aperture is selected in lens 52, and the shutter in camera 50 opened. Light source 70 is activated, causing light to be emitted from end 76b of fiber-optic cable 76. The photographer now has an opportunity to experiment with wand 80, determining how far from the subject the wand should be located to achieve the desired effect. Like a golfer taking a practice swing, the wand may be played over the subject indefinitely so long as window 30 is closed.

When the photographer is ready to expose the film, wand 80 is positioned to properly direct light onto subject 62. Filter 116 may be positioned over window 26 if a soft or special effect is desired, depending upon the optical characteristics of filter 116. Pressing filter activation switch 84 activates relay 108, relay switch 110 and rotary solenoid 38, thereby extending filter holder 42 and filter 116 over window 26. In the preferred embodiment, filter activation switch 84 must be held down to keep filter 116 in its extended position. Blade activation switch 82 is depressed, causing relay 100 to close switch 102, thereby activating linear solenoid 34 and shifting blade 28 to its fully withdrawn position. This, in turn, closes switch 36, and, provided that switch 106 is also closed, activates timer 104, which begins emitting audible tones, such as beeps, at one-second intervals. The audible signal provides an indication to the photographer of how long a particular exposure has been going on. Light reflected from the subject passes through window 26, lens 52, and selectively exposes a portion of the film held in film holder 56. At the end of the desired exposure time, blade activation switch 82 is again depressed, thereby unlocking the switch, releasing relay 100 and closing window 26 as blade 28 moves to its fully extended position. This of course releases first switch 36 and eliminates the operation of timer 104 and its integrally located beeper.

The photographer then directs the light to any other portions of the subject which are to be highlighted and repeats the operational sequence of the auxiliary shutter. In some instances, the overall time for making one photograph may be thirty to forty-five minutes, as repeated five to ten second exposures are made of individual parts of the subject. Filter 116 may be periodically extended or withdrawn over window 26 depending on the desired effect. For instance, assuming that filter 116 is of the soft focus type, the photographer may desire to soften the highlight on various parts of the subject by interposing filter 116 between lens 52 and subject 62. This is easily accomplished by pressing filter activation switch 84.

The provision of filter holder 42 and its associated hardware and electronics allows the use of filter 116 as desired by the photographer during the course of the shoot. Without this feature, a filter must be placed on and removed from the camera lens, which may result in movement of the camera. Alternately, to eliminate the possibility of moving the camera as the filter is repeatedly placed on and removed from the camera lens, all of those areas which are desired to be photographed with the filter in place must be photographed separately from those area which are not to be photographed with the filter. This procedure requires duplication of effort on the part of the photographer—who must photograph the entire subject with the filter in place—then rephotograph the entire subject without the filter in place——and remember which areas have been so photographed—to achieve desired effects. The provision of filter holder 42 allows the photographer to concentrate on one aspect of the subject and to selectively insert or remove the filter.

A variety of light-modifying implements may be affixed over the emission end of fiber-optic cable 76 to color the light or otherwise change its characteristics to further enhance the photographic effects.

All of the components of the exposure control apparatus that are normally visible, are finished in a dark matte finish. In the event that part of the apparatus is actually in the field of view of the camera during film exposure, the apparatus component will not reflect any light which would cause the film to be exposed. The photographer generally wears dark clothing and dark gloves so that no light is reflected off of his body during exposures.

The background of the studio may be uniformly dark, or, if that is not possible, or it is not desireable to have such a background, the background may be eliminated from the field of view of the camera by installing a mask over a portion of window 26 to eliminate any part of the field of view which is not desired to be exposed during the selective exposure of the film.

Exposure times and filter use must be determined experimentally by each photographer, depending on the desired effect to be created, the speed of the film, lens aperture, etc. Additionally, because the intensity of light is inversely proportional to the square of the distance from the light source to the object being illuminated, a less intense light, and hence, a longer time interval to achieve the same relative exposure of the film is required if the wand is held at a greater distance from the subject than if the wand is held close to the subject.

Thus an apparatus for controlling a photographic exposure has been disclosed. The invention provides for repeated exposures of portions of a light-sensitive film while not inducing movement into the camera support. The photographer may insert or remove a special effects filter during the photo session without touching the camera. Repeatable results may be achieved because the photographer knows precisely how long each exposure segment is. Although a preferred embodiment of the invention has been disclosed herein, it should be appreciated that further modifications and variations may be made to the apparatus without departing from the scope of the invention as defined in the appended claims.

What I claim is:

1. A photographic exposure control apparatus for selectively exposing with light reflected from a subject being photographed, portions of a light sensitive film contained in a camera having a lens comprising:
   directable light source means; and
   a free-standing auxiliary shutter means located between the camera lens and the subject, the auxiliary shutter means including a housing structure having a window therein, the window being selectively opened and closed by blade means which is movably mounted on the housing structure, the housing structure being operable to block entry of light into the lens when the window is closed and to admit light into the lens when the window is open, said auxiliary shutter means further including a filter holder which is remotely selectively operable to position and remove a filter between the camera lens and the subject.

2. The exposure control apparatus of claim 1 wherein said filter holder is mounted on said housing structure and which includes motor means for shifting the filter holder between a withdrawn position, wherein the filter is not between the lens and subject and an extended position, wherein the filter is interposed between the lens and the subject.

3. The exposure control apparatus of claim 2 wherein the motor means includes a rotary solenoid carried on the housing structure and connected to the filter holder.

4. The exposure control apparatus of claim 2 wherein the directable light source includes a switch carried thereon for activating the motor means.

5. A photographic exposure control apparatus for selectively exposing, with light reflected from a subject being photographed, portions of a light sensitive film contained in a camera having a lens comprising:
   a directable light source including a light-tight enclosure having a light source therein, an elongate fiber-optic, light transmitting cable extending from the light source to a cable-directing wand for directing emitted light to a desired location on the subject;
   an auxiliary shutter which is positioned between the subject and the lens for selectively allowing passage of emitted, reflected light from the subject to the camera, the auxiliary shutter including a window therethrough and a movable blade for opening and closing the window, the blade being movable between an extended position wherein the window is closed and a withdrawn position wherein the window is open, said auxiliary shutter means further including a filter holder which is remotely selectively movable between an extended position wherein the a filter carried in the filter holder covers the window and a withdrawn position wherein the filter is removed from its window-covering, extended position; and
   an activation mechanism for remotely operating the blade and the filter holder, the activation mechanism including switch means located on the wand and motor means located on the auxiliary shutter and connected to the blade and filter, and a connection circuit located between the switch means and the motor means for selectively moving the blade and/or the filter holder between their extended and withdrawn positions.

6. The exposure control apparatus of claim 5 wherein the auxiliary shutter includes a housing containing the blade therein and having the filter holder mounted thereon, with the window extending through the housing, and wherein the motor means includes a rotary solenoid mounted on the housing and operably attached to the filter holder, and wherein the connection circuit includes a relay located between the switch means and the solenoid, the switch being of the momentary contact type.

7. The exposure control apparatus of claim 6 which include and audible signal to indicate whether the filter is in its withdrawn or extended position.

* * * * *